United States Patent Office 3,481,406
Patented Dec. 2, 1969

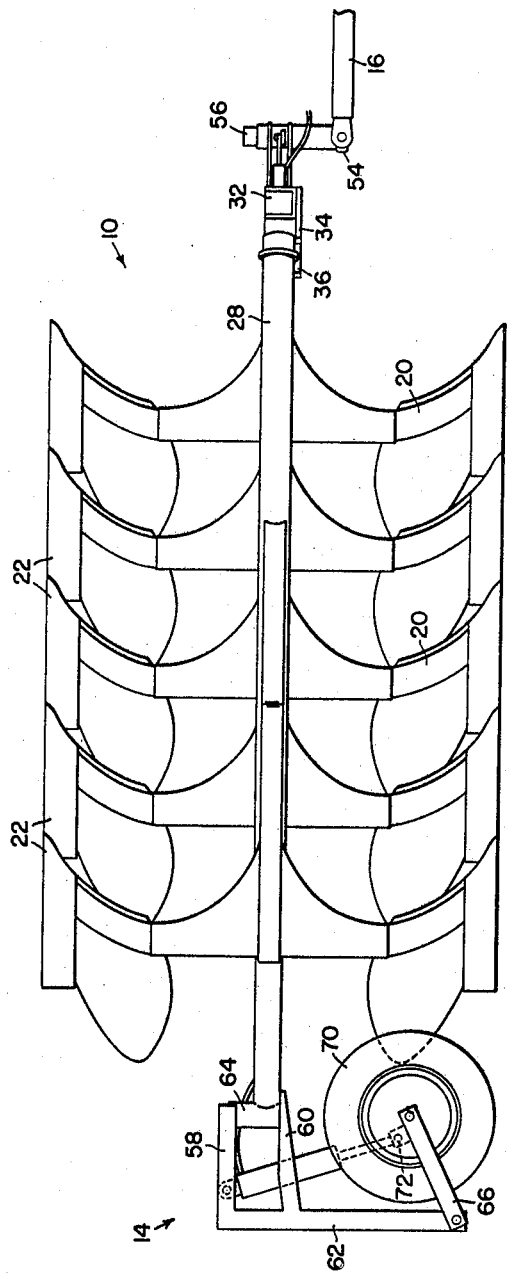

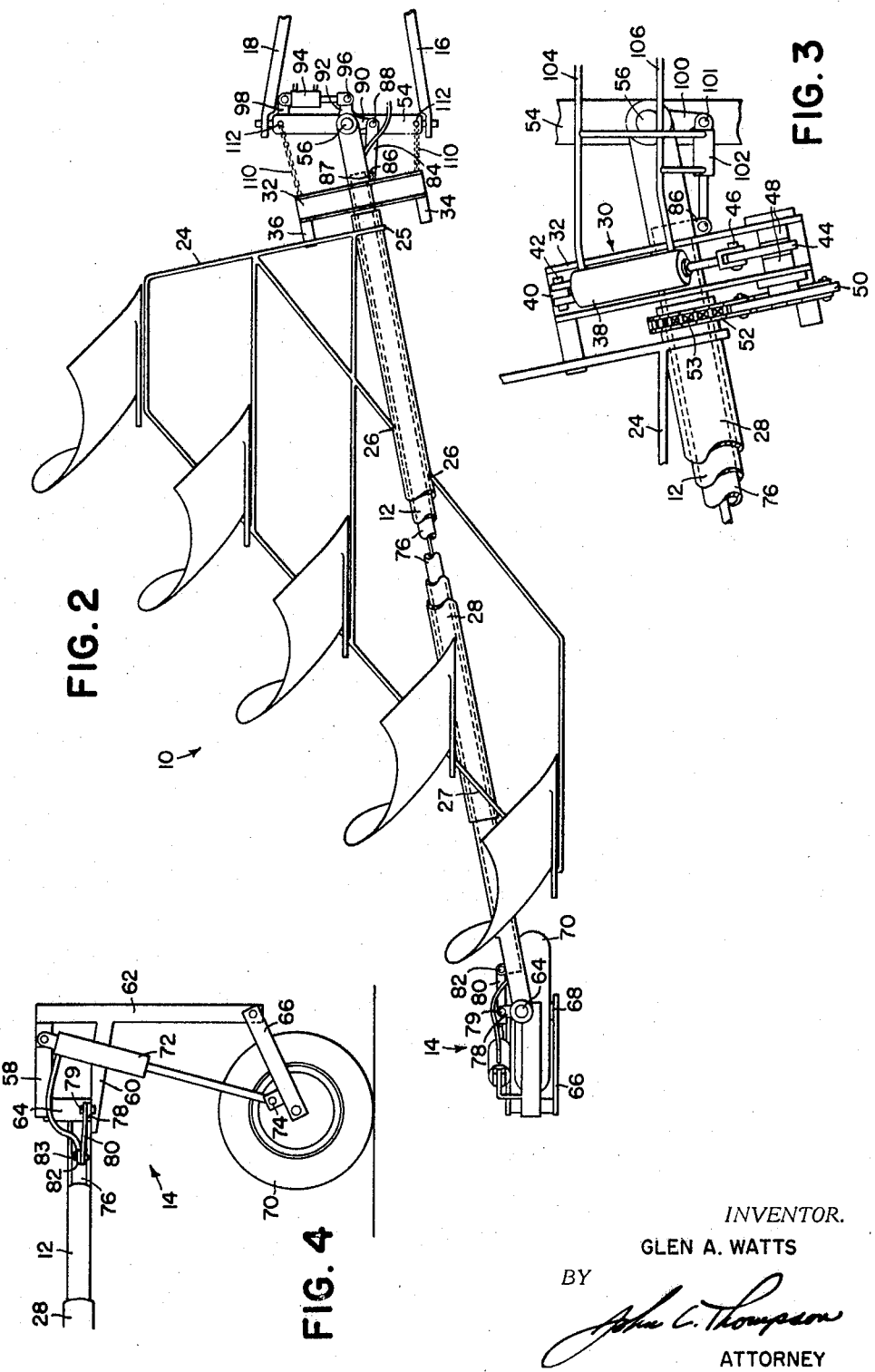

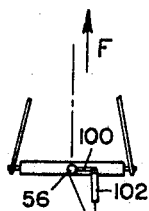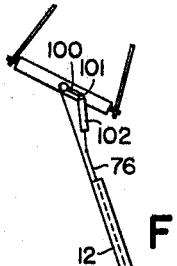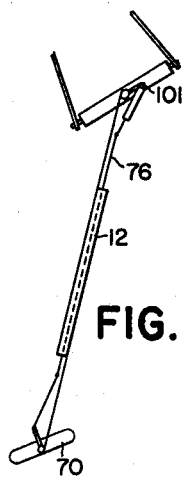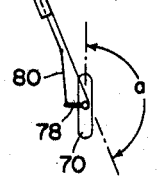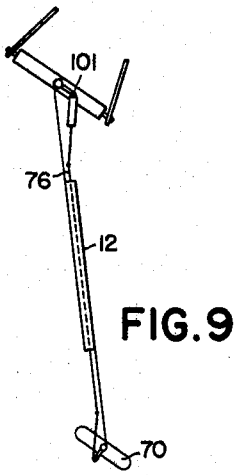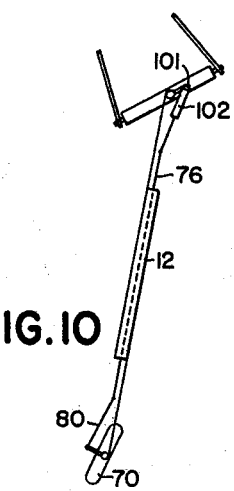

3,481,406
SEMIINTEGRAL TWO-WAY PLOW WITH
OFFSET STEERABLE TAIL WHEEL
Glen A. Watts, Rte. 1, Box 258,
McMinnville, Oreg. 97128
Filed Jan. 27, 1966, Ser. No. 523,314
Int. Cl. A01b 3/28, 3/56, 69/00
U.S. Cl. 172—204                    14 Claims

ABSTRACT OF THE DISCLOSURE

A roll-over two-way plow having right- and left-hand plow bottoms rotatably mounted about a longitudinally extending tubular member, the tubular member being supported at its rear end by a steerable rear furrow wheel. Steering means extend from the tractor hitch to the rear wheel through the tubular member. Means are provided to set the rear furrow wheel at different angular positions for right- and left-hand plowing so that the rear furrow wheel will be laterally offset from the center line of the tractor.

---

This invention relates to agricultural implements and more particularly to a semimounted two-way gang plow provided with an offset steerable furrow wheel.

Semiintegral two-way plows are known in the prior art and they are basically two different designs, namely narrow cut and wide cut. Where the bottoms take a relatively narrow cut, the plow gangs are mounted about a shaft which carries at its rear a furrow wheel centered directly behind the normal center line of the tractor. Examples of this type of semiintegral two-way plow are shown for example in the U.S. patent to Bonnel 2,788,727, issued Apr. 16, 1957 and the German patent to Bayerische 1,063,846 printed Aug. 29, 1959. These plows have proved satisfactory for use with tractors of relatively small horsepower. As tractor horsepower has increased in recent years, it has been desirable to employ plows of wider cuts. The design with the central furrow wheel does not lend itself to wide cuts since if the furrow wheel were mounted directly behind the center line of a tractor in a wide cut plow design, excessive side draft forces would be imposed upon the tractor. To eliminate objectionable side draft forces in wide cut two-way semiintegral plows, the furrow wheel has been offset to one side of the center line of the tractor. Three variations of this type of plow are set forth below. In the first variation, such as that shown in the Ransomes United Kingdom Patent 807,853, the plows are carried by a frame rotatable about a fore-and-aft extending axis passing through the center line of the plow, and on the rear of the plow frame is supported a dolly having two furrow wheels, one of the furrow wheels being properly positioned when plowing with the right-hand bottoms, and the other furrow wheel being properly positioned when plowing with the left-hand bottoms. A second form is illustrated in the German Patent 1,070,432 to Eberhardt and comprises a plow frame rotatable about an obliquely extending shaft 19 which carries a castering tail wheel that is set for right- or left-hand plowing by a cam and follower. A third type is illustrated in the United Kingdom patent to Bomford 950,912. In this type the right- and left-hand plows are mounted on an obliquely extending frame that is supported by front and rear parallel shafts which are interconnected by an intermediate shaft having universal joint connections with the parallel shafts. The furrow wheel is supported by the rear shaft and is maintained in a straight-ahead position by the interconnected shafts. In the prior art designs with which applicant is familiar, it has not been possible to steer the rear furrow wheel in an efficient manner.

Therefore, it is an object of this invention to provide a semimounted two-way gang plow in which the rear furrow wheel may be steered in response to turning movement of the propelling tractor with respect to the plow.

Another object of this invention is to provide a semimounted two-way gang plow with a steerable furrow wheel in which the furrow wheel may be set for either right- or left-hand plowing.

According to this invention, the furrow wheel is steered by means of a linkage extending through a non-rotatable tubular portion about which the right- and left-hand plow bottoms rotate. The linkage attaches at one side of the pivot point of the plow hitch carried by the lower draft links of a conventional farm tractor on the front, and attaches to an arm on the furrow wheel bracket at the opposite side, causing the furrow wheel to turn when the tractor turns. This makes the plow follow the path of the tractor.

Another object of this invention is to provide a way to set the furrow wheel at the rear of a reversible two-way gang plow by changing the position in which the wheel follows the tractor. This means, when the plow is in position for plowing left-hand furrows, the wheel is at the right side of the center in relation to the tractor, and when the plow is rotated for plowing with right-hand plows, the wheel must be at the left of center to enable the plow to follow directly behind the tractor without excessive side draft forces. This is accomplished by changing the effective length of the linkage which extends through the non-rotatable tubular portion.

A further object of this invention is to provide a semimounted two-way gang plow which is easy to maneuver, requires little maintenance, and is of relatively low cost.

These and other objects and advantages of this invention will be apparent to those skilled in the art after a consideration of the following detailed description, taken in conjunction with the accompanying drawings in which the preferred form of this invention is illustrated.

FIG. 1 is a side view of a preferred form of a semiintegral two-way gang plow secured to the lower draft links of a tractor, the roll-over mechanism not being illustrated.

FIG. 2 is a plan view of a plow illustrating a slightly modified form of furrow wheel setting means.

FIG. 3 is an enlarged plan view of a portion of the plow shown in FIG. 1 illustrating the roll-over mechanism.

FIG. 4 is a view of the furrow wheel assembly in its transport position taken from the left side of the plow.

FIG. 5 is a schematic plan view illustrating the position of the tail wheel with respect to the tractor draft links when plowing straight ahead in the left-hand plowing position.

FIGS. 6 and 7 are schematic views similar to FIG. 5 showing the position of the furrow wheel when making right- and left-hand turns, respectively.

FIG. 8 is a schematic plan view showing the position of the tail wheel when plowing straight ahead in the right-hand plowing position.

FIGS. 9 and 10 are views similar to FIG. 8 showing the position of the furrow wheel when making right- and left-hand turns, respectively.

The plow of this invention, which is indicated generally at 10 includes a non-rotatable main tube 12 about which a plurality of right- and left-hand plow bottoms are adapted to be rotated between right- and left-hand plowing positions, the main tube 12 being supported at the rear by a rear tail wheel assembly, indicated generally at 14, and at its forward end by a tractor having right- and left-hand lower draft links 16 and 18, respectively.

The left-hand plow bottom assemblies, which are indicated at 20, and the right-hand bottom assemblies 22 are carried by a rotatable frame, indicated in its entirety by 24, which is secured, as at 25, 26 and 27 to front intermediate and rear points of a rotatable tube 28 which is rotatably disposed about the main non-rotatable tube 12.

An indexing mechanism for rotating the frame between right-hand and left-hand plowing positions is indicated generally at 30 (FIG. 3) and includes a generally transversely extending frame member 32 which carries right- and left-hand stops 34, 36 which are contactable with the plow frame 24 when it is either in its right-hand or left-hand plowing position, respectively. The roll-over mechanism 30 further includes hydraulic actuating means in the form of an extensible and retractable ram 38 which has one end connected to an upstanding lug 40 on the frame member 32 by means of a pivot pin 42 and the other end being connected with a rock arm 44 by means of another pivot pin 46. The rock arm is carried by a rockshaft which is mounted for rotation within bearings 48 carried by the frame member 32. An actuating arm 50 is secured at its midportion to the rockshaft, which extends to the rear o fthe bearings 48, and a chain 52 is secured at either end to the ends of the arm 50, the intermediate portion of the chain disposed over a sprocket 53 fixedly secured to the rotatable tube 28. Extension of the cylinder 38 will cause the tube 28 to rotate in one direction, and retraction will cause it to rotate in the other direction.

The front of the plow 10 is supported on the draft links 16 and 18 by means of a crossbar 54 which is secured at either end to the draft links in a conventional manner, the crossbar having a generally vertically extending spindle 56 about which the forward end of the main tube 12 is swingably disposed.

The rear tail wheel assembly 14, supports the rear of the plow 10, includes a rigid supporting structure having spaced apart upper and lower fore-and-aft arms 58, 60, respectively which are interconnected at their rear ends with a vertically extending member 62. Interconnecting the forward ends of the arms 58 and 60 with the main tube 12 is a sleeve and pin assembly 64 which permits swinging movement of the tail wheel assembly with respect to the tube 12. An arm 66 is pivotally secured to the lower rear portion of the rigid structure 58, 60, 62 and carries on its forward end a transversely extending axle 68 (FIG. 2) which in turn carries a wheel 70, the axle being disposed substantially directly below the pin and sleeve assembly 64 when the wheel is in its working positions. An extensible and retractable hydraulic cylinder 72 interconnects the upper arm 58 of the rigid structure with an upstanding lug 74 carried by a forward end of the arm 66. Extension or retraction of the cylinder 72 will cause relative vertical movement of the wheel 70 thereby raising and lowering the rear end of the plow.

The means for interconnecting the tail wheel assembly 14 with the draft links of the tractor for steering the wheel when the tractor moves relative to the plow includes a tubular member 76 disposed within the main tube 12 for relative sliding movement therein. The rear end of the non-rotatable main tube is longitudinally apertured on one side and the tubular member 76 is provided with a laterally outwardly projecting lug 82 which extends through the aperture. An outwardly projecting torque-transmitting member or steering arm 78 is carried by the rigid structure coaxial with the pin and sleeve assembly 64. A link 80 interconnects the arm 78 with the lug 82, one end of the link being pivotally secured to the arm 78 by pin 79 and the other end being pivotally secured to the lug 82 by pin 83. In the form illustrated in FIG. 2 the forward end of the slidable tube 76 is connected with the cross bar 54 for sensing turning movement by means of a link 84, bell crank 90, 92, cylinder 94 and lug 98. To this end the tube 76 is provided with a lug 86 which projects outwardly of a longitudinal slot formed in the forward end of the main tube 12. The rear end of link 84 is secured to the projection by means of pivot pin 87. The bell crank 90, 92 is a torque transmitting member coaxial with and journaled about the pivot post 56. The forward end of link 84 is secured to bell crank arm 90 by a pivot pin 88. The other bell crank arm 92 is secured to one end of the cylinder 94 by pivot pin 96. The cylinder is secured at its other end to an anchor in the form of a lug 98 carried by the crossbar 54.

In the form illustrated in FIGS. 1, 3 and 5–10, the shaft 56 carries an anchor in the form of an outwardly projecting arm 100 to which one end of a double-action hydraulic cylinder 102 is secured, the other end of the cylinder 102 being secured to a projection 86 on the forward end of the slidable tube 76.

Referring now to FIGS. 5, 6 and 7 (which illustrate the plow shown in FIGS. 1 and 3 in the left-hand plowing position), it can be seen that when the tractor is advancing directly forwardly as indicated by the arrow F that the main tube 12 will extend rearwardly and to the right with the wheel 70 being held substantially parallel to the fore-and-aft center line of the tractor by means of the linkage which includes the arm 100, cylinder 102, slidable shaft 76, rear link 80, and arm 78. When the tractor turns to the right, as indicated in FIG. 6, it is desirable to turn the tail wheel to the left and this is accomplished through the geometry of the linkage 100, 102, 76, 80, 78 with respect to the main tube 12 which causes the distance between the point of connection 101 to move towards the tube 12, thereby sliding the tube 76 rearwardly within the tube 12 and causing the tail wheel 70 to rotate in a counterclockwise manner. The opposite is seen in FIG. 7 wherein the tractor turns to the left, the forward end of the tube 12 moving away from the point of connection 101, thereby causing the tube 76 to slide forwardly causing the wheel 70 to rotate in a clockwise manner.

When the plow is rolled over from the left-hand plowing position shown in FIG. 5 to the right-hand plowing position shown in FIG. 8, it is necessary to set the tail wheel 70 at a different angle with respect to the main tube 12 than when plowing in the left-hand position. This is illustrated by the angles A and B in FIGS. 5 and 8. This setting is varied by changing the effective length of the linkage between the tractor and the pivot pin 79 and can either be done by changing the length of the linkage between points 79 and 101, as is done in the system shown in FIGS. 1, 3, and 5–10, or in the alternative it can be done by changing the anchor point in the manner shown in FIG. 2. In the form shown in FIG. 3 when it is desired to index the plow from the left-hand position to the right-hand position, oil is introduced into the hydraulic line 104 from a source of fluid under pressure on the tractor, the fluid line being connected in parallel with the return line 106 through cylinders 38 and 102. Thus, as the fluid enters the line 104, it will cause the cylinder 38 to extend, thereby rotating the member 28 about the non-rotatable tube 12 to index the plows from the left-hand to the right-hand plowing position, and also to extend the cylinder 102 from the position shown in FIG. 5 to the position shown in FIG. 8, thereby setting the tail wheel 70 at the proper angle for right-hand plowing.

In the alternative design shown in FIG. 2, the tail wheel is set by extending or retracting the cylinder 94 which acts through the bell crank pivoted on the vertical shaft 56 to thereby change the effective length of the linkage by moving the anchor point 88.

To limit swinging of the plow frame 24 relative to the tractor, adjustable chains 110 are provided, each of the chains being fixed at one end to the transverse frame member 32 and adjustably disposed over an upstanding pin 112 on the end of crossbar 54, being held in any conventional manner.

Finally, with respect to FIGS. 9 and 10, it can be seen that when the plow is in the right-hand plowing position and the tractor turns to the right, the furrow wheel 70 will be moved to the left by means of the linkage described above, and similarly, when the tractor turns to the left, the tail wheel 70 will be moved to the right.

While the preferred structure in which the principles of the present invention have been incorporated is shown and described above, it is to be understood that the invention is not to be limited to the particular details, shown and described above, but that, in fact, widely different means may be employed in the practice of the broader aspects of the invention.

What is claimed is:

1. A semimounted two-way gang plow adapted to be propelled forwardly by a tractor comprising: a fore-and-aft extending non-rotatable tubular portion on which a plurality of right- and left-hand plow bottoms are mounted for rotational movement about a fore-and-aft extending axis between right- and left-hand plowing positions, mounting structure securable to a tractor, means supporting the tubular portion for relative lateral movement on the mounting structure about a first vertical axis, steerable rear furrow wheel means swingable secured about a second vertical axis at the rear of the tubular portion, steering interconnection means including a shaft means mounted for movement within said tubular portion, first linkage means interconnecting the front of said shaft with the mounting structure including a torque-transmitting member coaxial with the first vertical axis and constrained to move with the tractor whereby turning movement of the tractor relative to the tubular portion will cause movement of the shaft means within the tubular portion, and second linkage means including a torque-transmitting member coaxial with the second vertical axis interconnecting the shaft means with the rear furrow wheel means whereby movement of the shaft means within the tubular portion will effect steering of the furrow wheel means.

2. The plow set forth in claim 1 further characterized by the provision of means responsive to rotation of the plow bottoms between right- and left-hand plowing positions to set the furrow wheel with respect to the tubular portion for either right- or left-hand plowing by changing the effective length of the steering interconnection means whereby when in the right-hand plowing position the furrow wheel is disposed at a first angle to one side of the tubular portion and when in the left-hand plowing position the furrow wheel is disposed at a second angle to said one side of the tubular portion.

3. The plow set forth in claim 2 in which the means to set the furrow wheel means comprises an extensible and retractable hydraulic cylinder disposed within the linkage means.

4. The plow set forth in claim 1 in which said second vertical axis is formed by a vertically disposed pivot pin and sleeve assembly between the wheel means and the rear of said tubular portion, and the wheel means further includes rigid supporting structure extending downwardly and rearwardly from said pin and sleeve assembly, an arm secured at its rear end to the lower rear end of said rigid supporting structure, transversely extending axle means secured to the forward end of said arm and normally disposed substantially below said pin and sleeve assembly, and a furrow wheel carried by said axle.

5. The plow set forth in claim 4 in which said arm is pivotally mounted at its rear end to the rigid structure, and in which extensible and retractable raising and lowering means are provided which interconnect the forward end of said arm with an upper portion of the rigid structure.

6. The plow set forth in claim 5 in which said extensible and retractable raising and lowering means is a hydraulic cylinder, and in which said shaft means is apertured whereby fluid force may be transmitted within said shaft from said tractor.

7. A semimounted two-way gang plow adapted to be propelled forwardly by a tractor having fore-and-aft extending draft means including a pair of rearwardly extending raisable and lowerable draft links, said plow comprising: a non-rotatable main tube, a main frame rotatably disposed about said main tube, a plurality of right- and left-hand plow bottoms carried by said main frame, a hydraulically actuated roll-over mechanism interconnecting the main frame and the main tube and adapted to rotate the main frame between right-hand and left-hand plowing positions, a shaft extending through the main tube and movable longitudinally with respect thereto, a transversely extending crossbar securable at its ends to the draft links of the tractor, vertically extending forward pivot means interconnecting said crossbar and said main tube whereby said main tube can swing relative to said tractor, rear furrow wheel means normally disposed to one side of the fore-and-aft center line of the tractor when plowing in a straight line, the furrow wheel means including a steering arm, vertically extending rear pivot means interconnecting said rear furrow wheel means with the rear of the main tube, a rear link pivotally interconnected with said longitudinally movable shaft and said steering arm whereby longitudinal movement of said shaft will cause swinging movement of the rear furrow wheel means, anchor means carried by said crossbar and disposed to one side of said forward pivot means, forward link means interconnecting said anchor means with the front of the longitudinally movable shaft whereby turning movement of the crossbar relative to the main tube will cause said shaft to move longitudinally, thereby steering the rear furrow wheel means, and means to set the furrow wheel means for either right-hand or left-hand plowing by varying the effective length between the anchor means and the means interconnecting the bar and the rear link.

8. The plow set forth in claim 7 in which the means to set the furrow wheel comprises an extensible and retractable hydraulic cylinder disposed within the forward link means.

9. The plow set forth in claim 7 in which the means to set the furrow wheel is hydraulically actuated and the means to set the furrow wheel and the roll-over mechanism are hydraulically interconnected in parallel.

10. A semimounted two-way gange plow adapted to be propelled forwardly by a tractor comprising: a plow frame including a non-rotatable tubular means having front and rear end portions and on which a plurality of right- and left-hand plow bottoms are mounted for rotational movement between right- and left-hand plowing positions, means on the front end portion including first vertical pivot means securing the plow frame to a tractor for sideward swinging movement of the plow frame relative to the tractor, steerable rear furrow wheel means, means including second vertical pivot means on the rear portion of the tubular means supporting the furrow wheel means thereon for swinging movement about an upwardly extending axis, and furrow wheel steering means including a fore-and-aft extending member movably supported within said tubular means, the steering means further including a force-transmitting connection coaxial with the first pivot means between the forward portion of the member and the tractor whereby turning movement between the tractor and frame will effect movement of the member within the tubular frame, and a force-transmitting connection coaxial with the second pivot means between the rear portion of the member and the wheel means whereby movement of the member within the tubular frame will effect turning of the wheel means, said steering means thereby being operable to transmit turning movement of the plow frame relative to the tractor through the tubular means to the rear furrow wheel means to effect steering of said wheel means.

11. The semimounted two-way gang plow set forth in claim 10 further characterized by power-operated means for rotating the plow bottoms to their respective rightand left-hand plowing positions; a connection between the power-operated means and the furrow wheel steering means for automatically resetting the furrow wheel means with respect to the non-rotatable tubular means when plowing in the right- and left-hand plowing positions to cause the rear furrow wheel means to be laterally offset from the center line of the tractor when plowing in a straight line.

12. A semimounted two-way plow comprising: a plow frame securable to and laterally swingable in respect to a tractor and including a non-rotatable member on which a plurality of right- and left-hand plow bottoms are mounted for rotational movement between right- and left-hand plowing positions, rotatable means operable to selectively rotate said plow bottoms between their right- and left-hand plowing positions, rear furrow wheel means mounted on the rear of said plow frame for swinging movement about an upwardly extending axis between right- and left-hand alternate positions, and means responsive to rotational movement of the plow bottoms between their right- and left-hand alternate plowing positions to effect positive swinging of the rear furrow wheel to its respective alternate positions with respect to the non-rotatable member.

13. The semimounted two-way plow set forth in claim 12 in which said rotatable means includes a first double-acting hydraulic cylinder, and said means to effect positive swinging of the rear furrow wheel includes a second double-acting hydraulic cylinder connected in parallel to said first cylinder.

14. The semimounted two-way plow set forth in claim 12 in which means are provided to steer the rear furrow wheel in response to turning movement of the tractor relative to the frame, said steering means including a mechanical force-transmitting means which extends through said non-rotatable member.

References Cited

UNITED STATES PATENTS

| 437,666 | 9/1890 | Sobey | 172—285 |
| 683,242 | 8/1901 | Annett | 172—285 |
| 1,578,084 | 3/1926 | Neufang | 172—291 X |
| 2,879,853 | 3/1959 | Seng | 172—226 |
| 3,061,020 | 9/1962 | Mannheim | 172—285 |

FOREIGN PATENTS

| 1,088,573 | 9/1954 | France. |
| 544,687 | 8/1957 | Canada. |

ROBERT E. PULFREY, Primary Examiner

W. J. CONLON, Assistant Examiner

U.S. Cl. X.R.

172—285, 291X